(No Model.) 2 Sheets—Sheet 1.
E. S. HUGHES & G. CONNER.
CORN PLANTER.
No. 450,019. Patented Apr. 7, 1891.
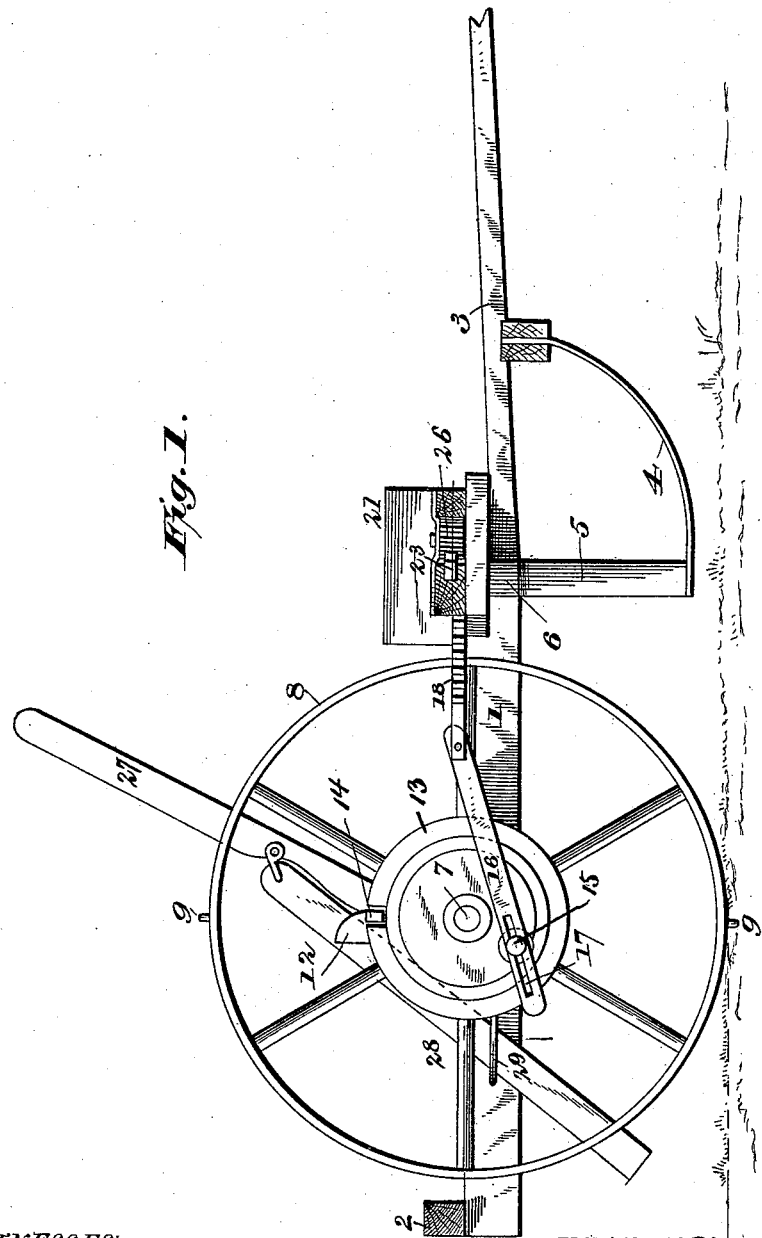

(No Model.) 2 Sheets—Sheet 2.
E. S. HUGHES & G. CONNER.
CORN PLANTER.
No. 450,019. Patented Apr. 7, 1891.
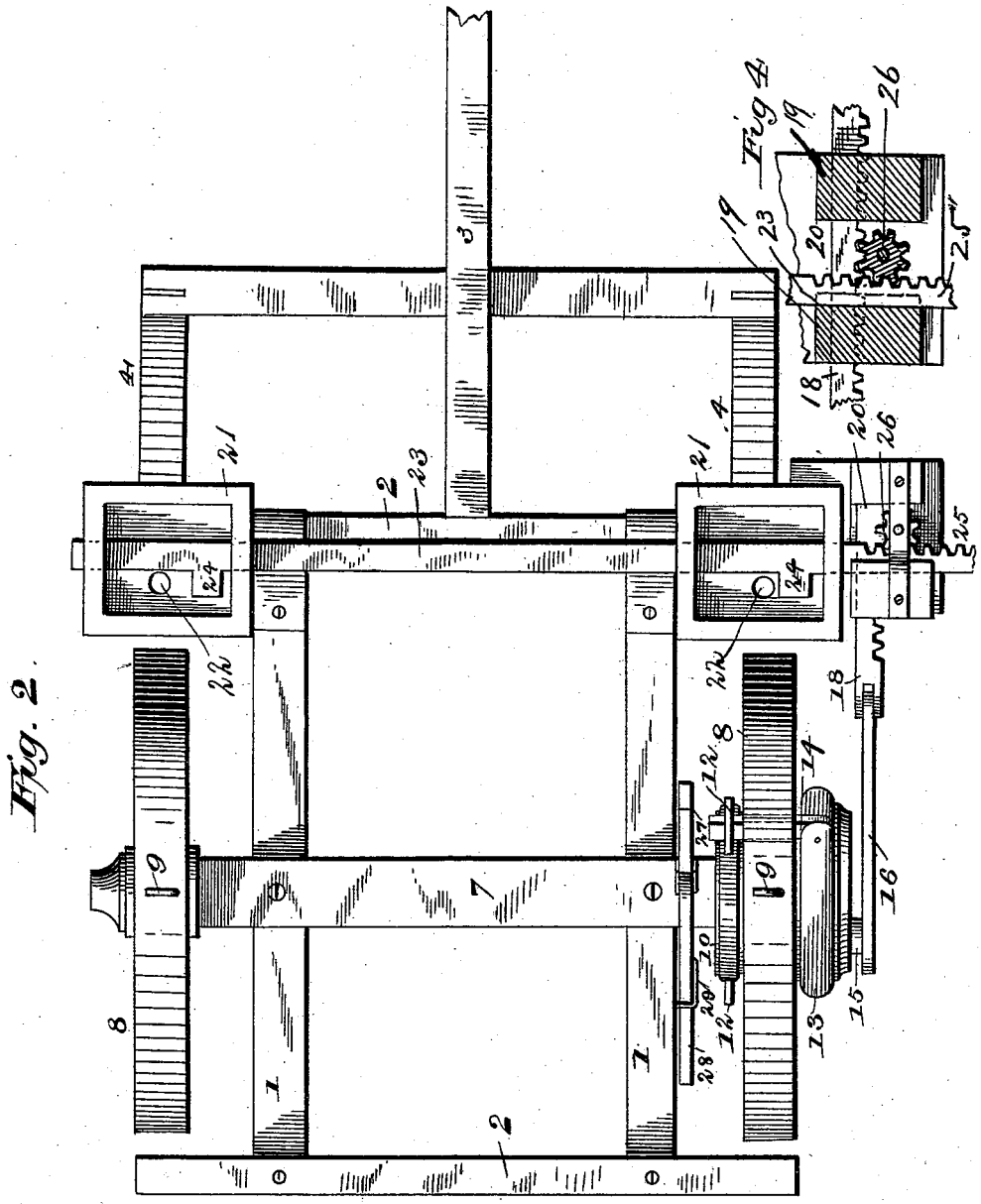
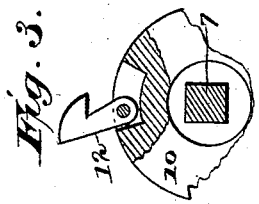
WITNESSES:
INVENTORS:

United States Patent Office.

EVENS S. HUGHES AND GEORGE CONNER, OF SEDAN, KANSAS.

CORN-PLANTER.

SPECIFICATION forming part of Letters Patent No. 450,019, dated April 7, 1891.

Application filed November 28, 1890. Serial No. 372,885. (No model.)

*To all whom it may concern:*

Be it known that we, EVENS S. HUGHES and GEORGE CONNER, both residents of Sedan, in the county of Chautauqua and State of Kansas, have invented certain new and useful Improvements in Corn-Planters; and we do hereby declare that the following is a full, clear, and exact description of the invention, which will enable others skilled in the art to which it appertains to make and use the same, reference being had to the accompanying drawings, which form a part of this specification.

Our invention relates to improvements in corn-planters.

The object of the invention is to provide a simple and economical construction of corn-planter, whereby we secure important advantages in regard to efficiency of operation.

The invention consists in the novel construction and combination of parts, hereinafter fully described, and definitely pointed out in the claim.

In the accompanying drawings, Figure 1 is a side elevation of a corn-planter constructed in accordance with our invention. Fig. 2 is a plan view of the same. Fig. 3 is a view of the fixed disk 10. Fig. 4 is a detail view showing the reciprocating rack-bar in the guides or ways in which it works.

In the said drawings, the reference-numeral 1 designates the side bars of the planter, and 2 the end bars, constituting the wheel-frame of the device. It is provided with the usual tongue 3, and has curved runners 4, secured to depending conductors 5, and connected at their upper ends by means of cross-bar 6.

The numeral 7 designates the axle provided with supporting-wheels 8, which are provided with markers 9, by which depressions are made in the hills of corn and serve as guides in planting the next succeeding rows. One of the wheels is provided with a fixed disk 10 on its inside having a catch 12. This catch consists of a notched bar secured in a slot in said disk. Upon the outside of the wheel is a loose disk 13, having a hinged or pivoted arm 14, adapted to engage with the catch on the fixed disk, whereby the disk 13 may be rotated. This disk is also provided with a crank-pin 15, to which is connected a pitman 16, having a slot 17 therein for adjusting its throw. To the front of this pitman is connected a rack-bar 18, which reciprocates in guides or ways 19 in a plate 20, secured to the front of the wheel-frame.

The numeral 21 designates the seed-boxes, which may be of any ordinary or suitable construction, having seed-apertures 22 in the bottom. Passing transversely across the frame and through the seed-boxes is a bar 23, having a valve or slide 24, which alternately opens and closes the seed-openings as the bar is reciprocated back and forth. One end of this bar is provided with a series of rack-teeth 25, which engage with a pinion 26, journaled in the plate 20, this pinion in turn gearing with the rack-bar 18.

Pivoted to the axle is a lever 27, to which is connected a bar 28, passing through a guide 29 in the frame. The object of this construction is to enable the wheel carrying the markers to be raised without the driver leaving his seat, so that said markers may be shifted or adjusted.

The operation will be readily understood. The disks 10 and 13, being connected by means of the arm 14 and catch 12, are rotated as the wheels revolve, causing the bar 23 to be reciprocated by means of the pitman 16 and its connections, and the corn to be thereby fed through the seed-openings. The disks can be thrown out of gear by disengaging the arm 14 from the catch. As the wheels move over the ground the markers thereon will make depressions in each hill of corn, which serve as guides in planting the next succeeding rows, as will be obvious.

Having thus described our invention, what we claim is—

In a corn-planter, the combination, with the frame, the axle, the wheels, the fast and loose disks, the catch on the fixed disk, and the pivoted arm on the loose disk, of the adjustable pitman, the rack-bar connected therewith, the seed-boxes having apertures therein, the transverse bar having valves or slides and provided with rack-teeth, and the pinion engaging with said bar and with the rack-bar connected with the pitman, substantially as described.

In testimony that we claim the foregoing as our own we have hereunto affixed our signatures in presence of two witnesses.

EVENS S. HUGHES.
GEORGE CONNER.

Witnesses:
ADRIAN REYNOLDS,
D. J. MOORE.